United States Patent
Fagerlund et al.

(10) Patent No.: US 8,180,978 B1
(45) Date of Patent: May 15, 2012

(54) ADDRESS LOCKED LOOP

(75) Inventors: Richard J. Fagerlund, Morgan Hill, CA (US); David B. Isaksen, Mountain View, CA (US); Philip R. Sanfilippo, San Jose, CA (US); Boris G. Tankhilevich, Walnut Creek, CA (US)

(73) Assignee: Wideband Semiconductors, Inc., Mountain View, CA (US)

( * ) Notice: Subject to any disclaimer, the term of this patent is extended or adjusted under 35 U.S.C. 154(b) by 1002 days.

(21) Appl. No.: 12/214,206

(22) Filed: Jun. 16, 2008

(51) Int. Cl.
*G06F 12/02* (2006.01)

(52) U.S. Cl. ............... 711/154; 711/170; 711/E12.001; 370/395.1

(58) Field of Classification Search .................. None
See application file for complete search history.

(56) References Cited

U.S. PATENT DOCUMENTS

| | | | | |
|---|---|---|---|---|
| 3,390,379 | A * | 6/1968 | Carlson et al. | 710/52 |
| 5,457,687 | A * | 10/1995 | Newman | 370/232 |
| 6,697,368 | B2 | 2/2004 | Chang et al. | |
| 6,711,170 | B1 * | 3/2004 | Brown | 711/E12.079 |
| 2003/0084234 | A1 * | 5/2003 | Hang | 711/105 |
| 2003/0163589 | A1 * | 8/2003 | Bunce et al. | 709/250 |
| 2005/0273568 | A1 * | 12/2005 | Blandy | 711/170 |
| 2007/0019686 | A1 * | 1/2007 | Belk et al. | 370/516 |

* cited by examiner

*Primary Examiner* — Michael Krofcheck
(74) *Attorney, Agent, or Firm* — Boris G. Tankhilevich

(57) ABSTRACT

An address locked loop (ALL) apparatus for address recycling is provided. The apparatus comprises a block of memory further comprising a plurality of buffers configured to store a plurality of incoming packets, an address stack configured for storing of a plurality of free addresses, an address locked loop (ALL) control block configured to provide an arbitrated interface with the address stack for filling address requests by a local process and for returning free addresses from the local process to the address stack, and a stack address counter configured to maintain count of the available free addresses remaining on the address stack.

1 Claim, 4 Drawing Sheets

A Network of ALL

ADDRESS LOCKED LOOP

TECHNICAL FIELD

The technology relates to the field of digital signal processing.

BACKGROUND

A typical local process, like modulation, stores, processes, and transmits the packets of data by using a plurality of addresses. Another typical local process, like de-modulation, receives, stores, and processes the packets of data by using a plurality of addresses. However, the addresses that are becoming free of data can be recycled to simplify and increase the speed of data processing by any local process.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An address locked loop (ALL) apparatus for address recycling is provided. The ALL apparatus comprises a block of memory further comprising a plurality of buffers, wherein each buffer has the same byte size. Each block of the memory is configured to store a plurality of incoming packets. An incoming packet is stored in at least one buffer if a byte size of the incoming packet is less than the byte size of the buffer. On the other hand, if the byte size of an incoming packet is greater than the byte size of a buffer, the incoming packet is stored in a plurality of buffers. The ALL apparatus further comprises an address stack configured for storing of a plurality of free addresses, wherein each free address corresponds to one free buffer. The ALL apparatus further comprises an address locked loop (ALL) control block coupled to the address stack, wherein the address locked loop control block is configured to provide an arbitrated interface with the address stack for filling address requests by a local process and for returning free addresses from the local process to the address stack. The ALL apparatus also comprises a stack address counter configured to maintain count of the available free addresses remaining on the address stack.

DESCRIPTION OF THE DRAWINGS

The accompanying drawings, which are incorporated in and form a part of this specification, illustrate embodiments of the technology, and together with the description, serve to explain principles discussed below.

DETAILED DESCRIPTION

Reference will now be made in detail to embodiments of the present technology, examples of which are illustrated in the accompanying drawings. While the present technology is described in conjunction with various embodiments, the present technology is not limited to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of various exemplary embodiments of the present technology. However, the present technology may be practiced without these specific details. In other instances, well known methods, procedures, components, and circuits have not been described in detail so as not to unnecessarily obscure aspects of the presented embodiments.

Figure 1:
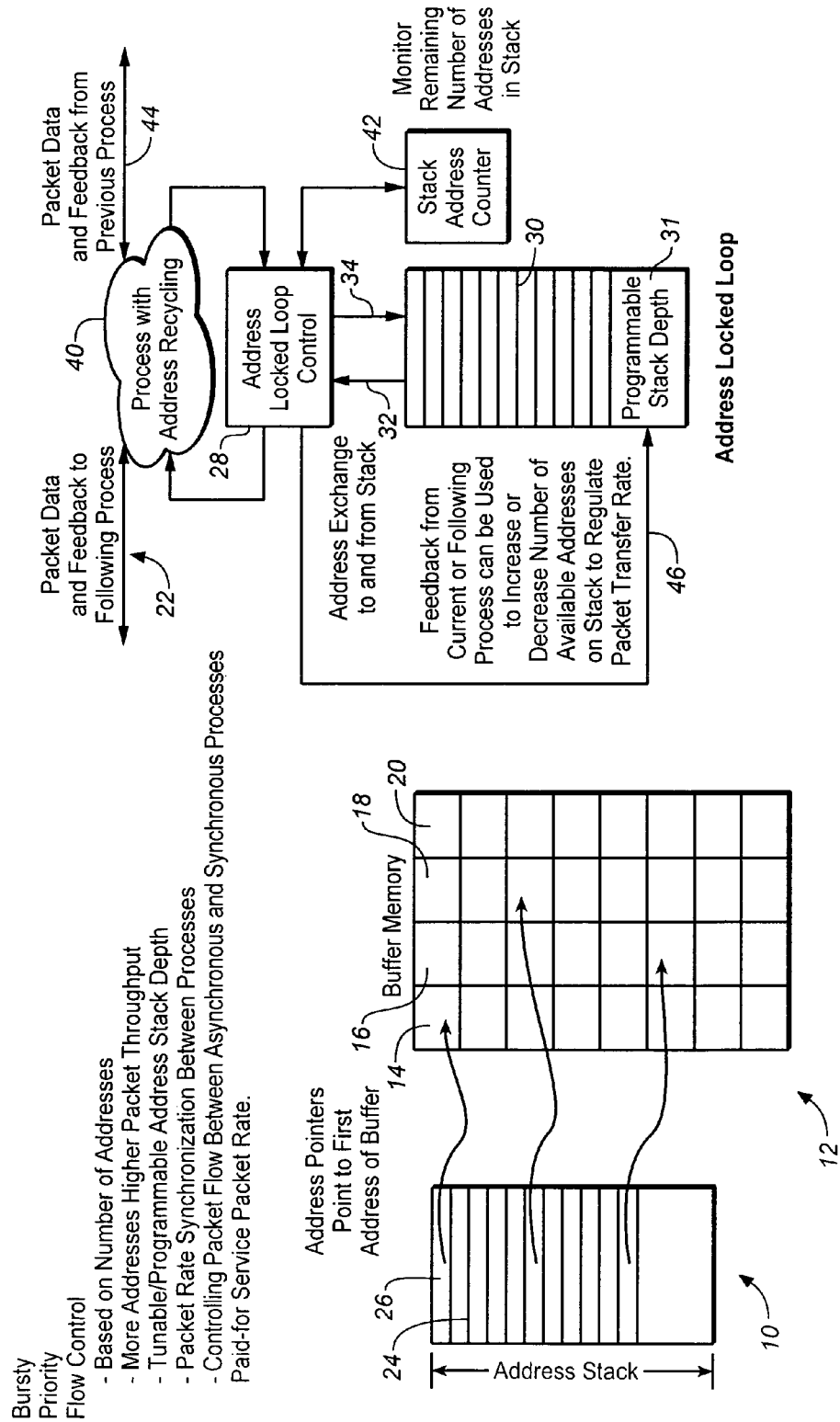
FIG. 1 is a block diagram of an address locked loop (ALL) apparatus in accordance with an embodiment of the present technology.

In accordance with an embodiment, FIG. 1 illustrates an address locked loop (ALL) apparatus 10 for address recycling. The ALL apparatus 10 comprises a block of memory 12 further comprising a plurality of buffers (14, 16, 18, 20 . . . ).

In one embodiment, each buffer (14, 16, 18, 20, . . . ) has the same byte size. The block of the memory 12 is configured to store a plurality of incoming packets 22. Each incoming packet is stored in at least one buffer if a byte size of the incoming packet is less than the byte size of the buffer. On the other hand, if the byte size of an incoming packet is greater than the byte size of a buffer, the incoming packet is stored in a plurality of buffers.

Moreover, in an embodiment, the ALL apparatus 10 further comprises an address stack 24 configured for storing of a plurality of free addresses, wherein each free address (for example, free address 26) corresponds to one free buffer (for example, buffer 14).

In an embodiment, the ALL apparatus 10 further comprises an address locked loop (ALL) control block 28 coupled to the address stack 30. The address locked loop control block 28 is configured to provide an arbitrated interface with the address stack 30 for filling address requests (interface line 32) by a local process 40 and for returning free addresses (interface line 34) from the local process 40 to the address stack 30. The ALL apparatus also comprises a stack address counter 42 configured to maintain count of the available free addresses remaining on the address stack 30.

In an embodiment, a group of predetermined buffer addresses is assigned for storage of incoming packets 22 (or 44). The number of address available from stack 30 to be used in the local process 40 can be adjusted as required by using a feedback 44 from a previous local process or by using a feedback 22 from a following local process. More addresses, faster throughput, fewer addresses, slower throughput. Thus, the packet transfer rate can be regulated.

In an embodiment, the stack address counter 42 maintains count of number of free addresses remaining on the stack 30.

Furthermore, in an embodiment, the ALL control block 28 provides an arbitrated interface with the address stack 30 for filling address requests by a local process 40 and returning free address from the local process to the address stack.

More specifically, based on need or operational parameters, the ALL control block 28 can adjust the number of addresses on the stack 30 for use in the local process 40. It can also react to feedback 22 from a following process or provide feedback 44 to a previous process based on the number of free addresses on the stack 30 as determined by the stack address counter 42.

In one embodiment, more specifically, if the number of free addresses on the stack 30 reaches a low threshold, the ALL control block 28 can issue feedback 44 to the previous process, instructing it to slow its packet throughput. On the other hand, if the number of free addresses on the stack 30 reaches an upper threshold, the ALL control block 28 can issue feedback 44 to the previous process, advising it that the current process 40 can handle a higher packet rate throughput.

In an embodiment, the ALL Control receives feedback 22 from the following process advising it to slow down or speed up the local processes 40 throughput, the number of addresses available from the stack 30 can be adjusted. Thus, the more free addresses are available on the address stack 30, the higher packet throughput is allowed. The fewer addresses are available on the address stack 30, the lower throughput is allowed thus restricting or slowing the local process 40 throughput.

In one embodiment, by adjusting the stack depth 31 the address locked loop apparatus can provide flow control between asynchronous and synchronous processes based on number of packet addresses available.

Asynchronous processes use different clock sources. An example of the asynchronous process is the Ethernet. Indeed, in this case all the computers are operating using their own clocks. Some of these computers operate at similar speeds, but never exactly at the same speed.

On the other hand, synchronous processes use the same clock source. For example, if all the components of the computer operate off the same internal clock, it is an example of a synchronous process.

Figure 2:
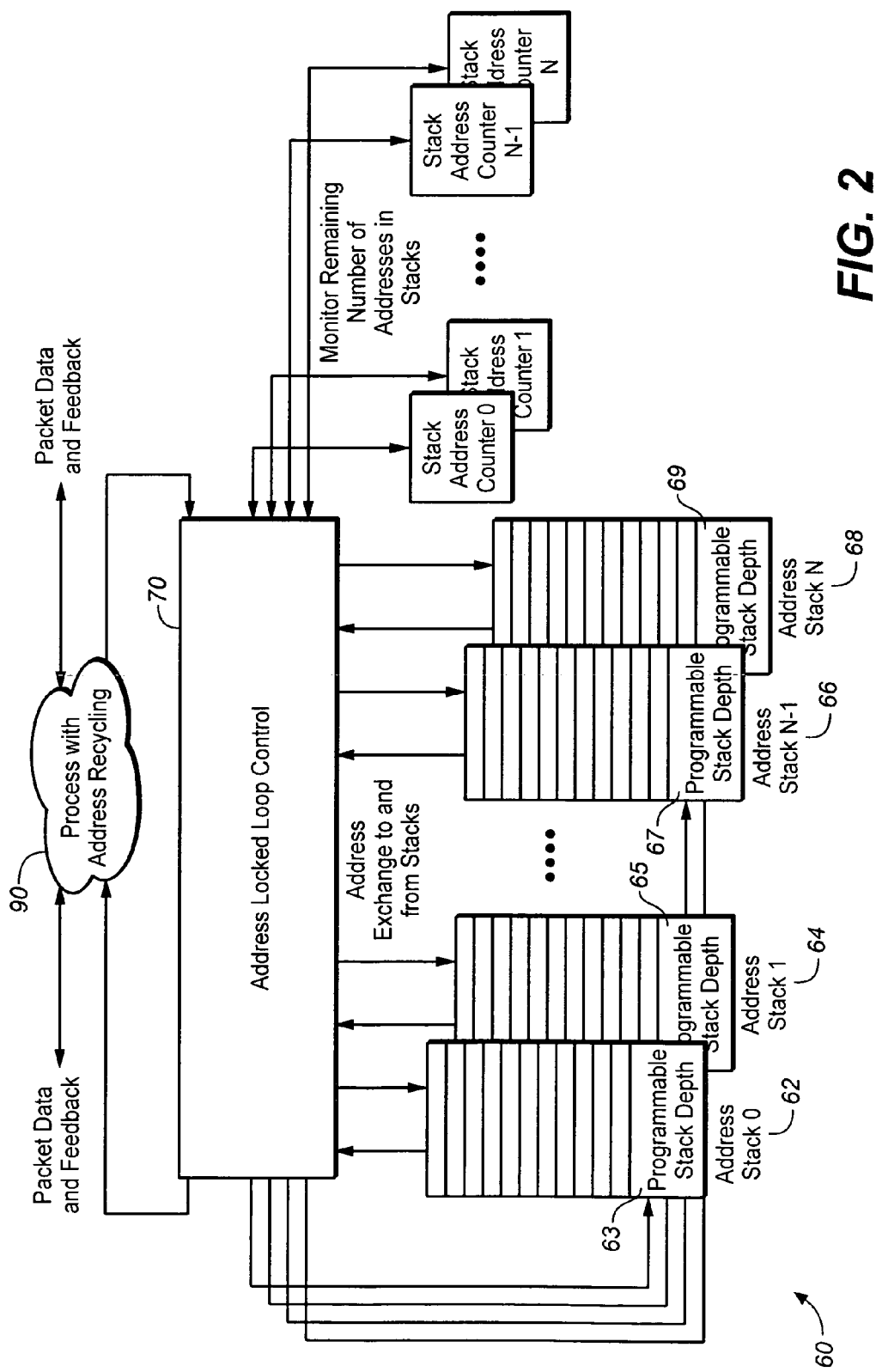
FIG. 2 depicts a block diagram of an address locked loop (ALL) apparatus having a multi-stack address block in accordance with an embodiment of the present technology.

FIG. 2 depicts a block diagram 60 of an address locked loop apparatus (ALL) having a multi-stack address block in accordance with an embodiment of the present technology. In this embodiment, the address locked loop control block 70 controls multi stack address block including an integer N plurality of address stacks having programmable stack depths: address stack "0" 62 having programmable stack depth 63, address stack "1" 64 having programmable stack depth 65, ... . address stack "N−1" 66 having programmable stack depth 67, and address stack "N" 68 having programmable stack depth 69. More addresses on the multi stack ($N > N_{threshold}$) would allow for more packets to be inducted into the local process 90. On the other hand, fewer addresses on the multi stack ($N < N_{threshold}$) will restrict the number of packets to be inducted into the local process 90. The threshold number $N_{threshold}$ is dependent on exact nature of the local process 90.

Figure 3:
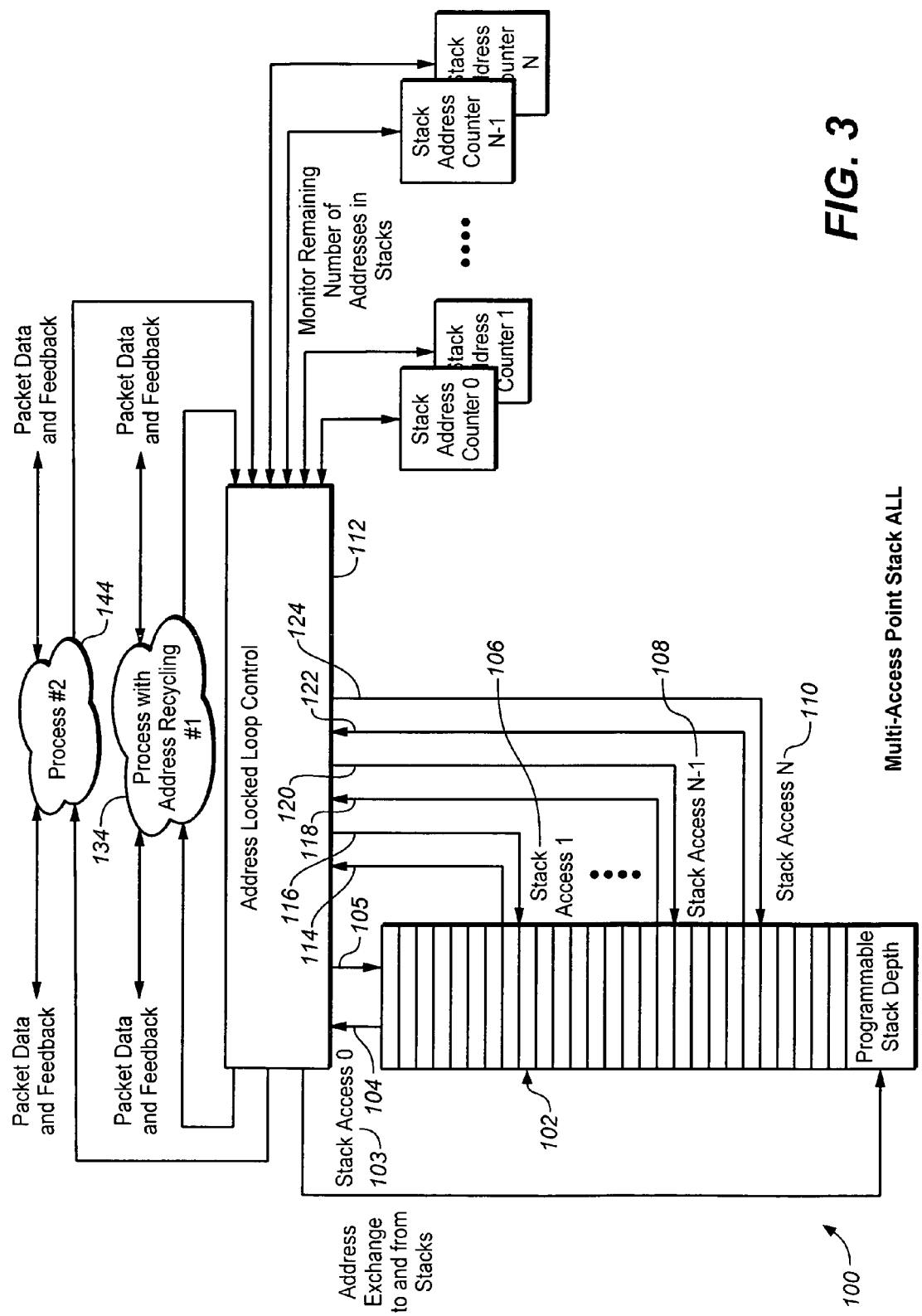
FIG. 3 is a block diagram of an address locked loop (ALL) apparatus having a multi-access point stack address block in accordance with an embodiment of the present technology.

FIG. 3 illustrates a block diagram 100 of an address locked loop apparatus having of a multi-access point address stack 102 in accordance with an embodiment of the present technology. In this embodiment, the address locked loop control block 112 provides an arbitrated interface with the multi-access point address stack 102 at the access point "0" 103 for filling address requests (interface line 104) by a local process 134 and for returning free addresses (interface line 105) from the local process 134 to the address stack 102.

Furthermore, in this embodiment, the address locked loop control block 112 provides an arbitrated interface at the access point "1" 106 with the multi-access point address stack 102 for filling address requests (interface line 114) by a local process 134 and for returning free addresses (interface line 116) from the local process 134 to the address stack 102.

Moreover, in this embodiment, at the access point "N−1" 108, the address locked loop control block 112 also provides an arbitrated interface with the multi-access point address stack 102 for filling address requests (interface line 118) by a local process 134 and for returning free addresses (interface line 120) from the local process 134 to the address stack 102.

Finally, the address locked loop control block 112 provides an arbitrated interface with the multi-access point address stack 102 at the access point "N" 110 for filling address requests (interface line 122) by a local process 134 and for returning free addresses (interface line 124) from the local process 134 to the address stack 102.

In this embodiment, the address locked loop control block 112 is configured to control a plurality of independent local processes with address recycling running in parallel (local process 134, local process 144, etc.) by providing to each of them an independent access point to the address stack 102.

In this embodiment, assuming that a local process models a single customer, user restrictions can be placed on the packet throughput based on the subscription service that a customer buys. For example, by prioritizing access points 104, 106 ... 108, and 110, the address locked control block 112 will connect a customer that subscribes to a more expensive service to a priority access point.

Figure 4:
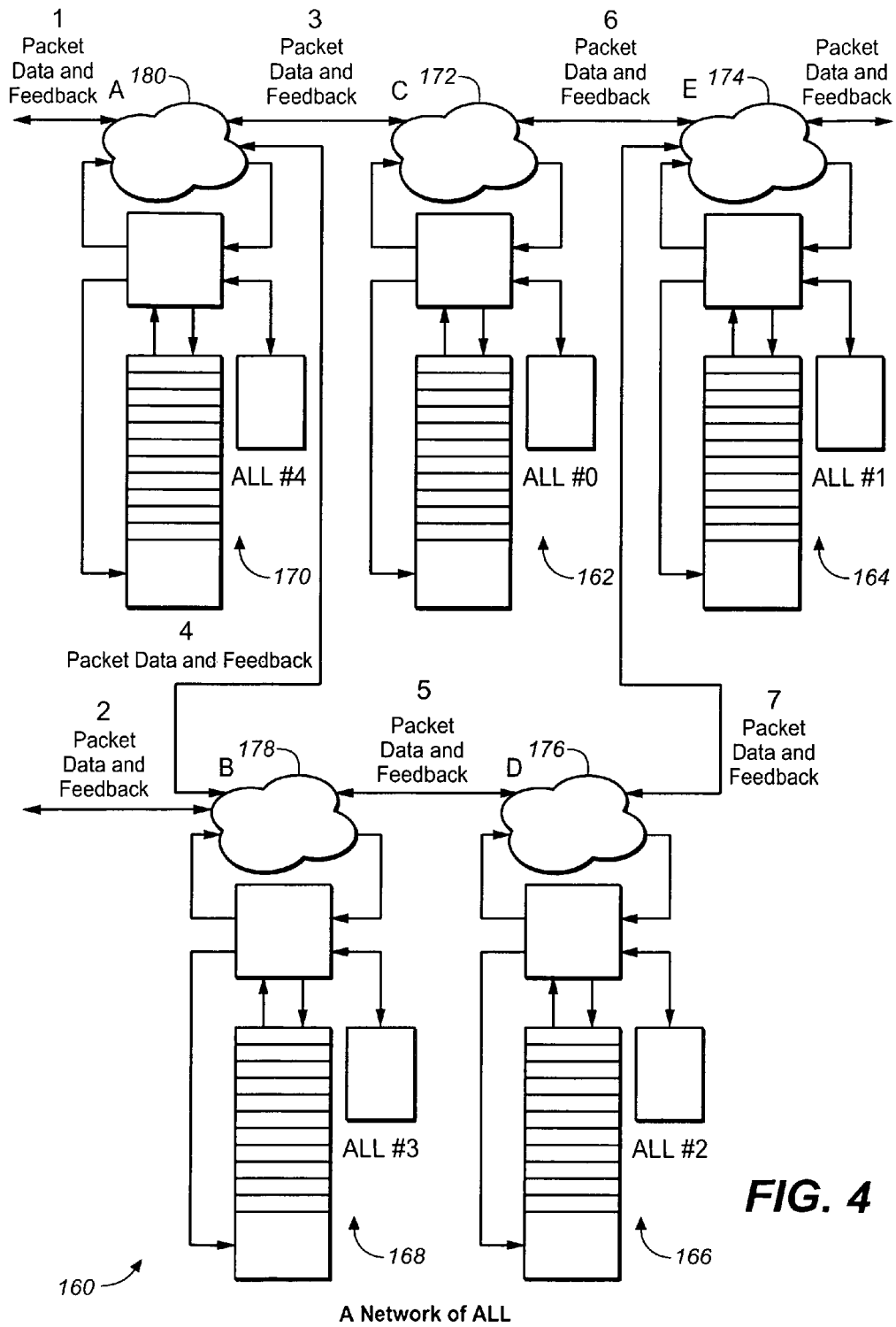
FIG. 4 shows a block diagram of a network of autonomous address locked loops (ALL) in accordance with an embodiment of the present technology.

FIG. 4 is a block diagram 160 that illustrates a network of address locked loops 162 (ALL #0); 164 (ALL #1); 166 (ALL #2); 168 (ALL #3); and 170 (ALL #4) in an embodiment of the present technology. This ALL network 160 is a collective of autonomous local processes C (172), E (174), D (176), B (178), and A (180) with no overall master. Each local process (A through D) is configured to perform a specific task or set of tasks as required by design.

Depending on the nature of a particular local process (static or dynamic), and/or work-load distribution of the network, some processes may be required to perform a greater number of functions on the incoming packets (or frames). For some processes (like for a Process B) packets may arrive from multiple destinations. In either case, process-specific operations may be performed faster by using either serial, or a parallel design to maintain required throughput. These critical paths may require special attention during network design to avoid excessive idle time. However, the nature of a packet-based ALL network 160 will allow for discontinuous packet flow by simply having processes switch to an idle state when its associated free address stack is full.

Each process is designed based on speed and throughput requirements of the network as a whole. For example, serial Process D 176 may be required to perform more intensive work based on the contents of the received packets. Process E 174 should wait until Process D 176 has completed its tasks and passed the packet on. During this time Process D has to slow its throughput. If it begins to run low on free addresses, it should communicate to Process B 178 to slow or halt sending packets. Similarly, Process B may have to communicate to the preceding processes to slow or halt their throughput as well. Once Process D is able to resume a higher throughput, it should communicate its new processing state to Process B. Process B in turn should notify the other relevant Processes (like Process A) to resume sending its packets to Process B. If process E 174 is required to wait on packets from Process D 176, it will sit idle once its free address stack is empty.

In an embodiment of the present technology, the ALL network 160 is flow-controlled via process-process feedback. This feedback mechanism could be implemented by using small packets containing information with regards to process status or by using simple flags, depending on the network design.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer (not shown).

In an embodiment, the computer-readable and computer-executable instructions reside, for example, in data storage features such as computer-usable volatile memory unit, computer-usable non-volatile memory, or optional computer-usable data storage. Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. An address locked loop (ALL) apparatus for address recycling comprising:

a block of memory comprising a plurality of buffers; each said buffer has the same byte size; said block of memory is configured to store a plurality of incoming packets; wherein said incoming packet is stored in at least one said buffer if a byte size of said incoming packet is less than said byte size of said buffer; and wherein said incoming packet is stored in a plurality of buffers if said byte size of said incoming packet is greater than said byte size of one said buffer;

an address stack configured for storing of a plurality of free addresses; wherein each said free address corresponds to one said free buffer;

an address locked loop (ALL) control block coupled to said address stack; said address locked loop control block configured to provide an arbitrated interface with said address stack for filling address requests by a local process and for returning free addresses from said local process to said address stack; wherein said address locked loop (ALL) control block further comprises:

an address locked loop (ALL) control feedback interface configured to send a feedback signal to a previous local process; and configured to receive a feedback signal from a following local process; wherein said ALL control feedback interface is configured to provide a data flow control between said previous local process and said following local process; and wherein said ALL control feedback interface further comprises:

a plurality of flags; a first said flag is configured to indicate said local process status; a second said flag is configured to indicate said previous process status; a third said flag is configured to indicate said following process status;

and a stack address counter coupled to said ALL; said stack address counter configured to maintain count of said available free addresses remaining on said address stack.

* * * * *